United States Patent
Guillou et al.

(10) Patent No.: US 10,632,440 B2
(45) Date of Patent: Apr. 28, 2020

(54) CLC PROCESS AND INSTALLATION WITH THE PRODUCTION OF HIGH PURITY NITROGEN

(71) Applicants: IFP Energies nouvelles, Rueil-Malmaison (FR); TOTAL RAFFINAGE CHIMIE, Courbevoie (FR)

(72) Inventors: Florent Guillou, Ternay (FR); Stephane Bertholin, Chaponost (FR); Mahdi Yazdanpanah, Le Havre (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 199 days.

(21) Appl. No.: 15/745,898

(22) PCT Filed: Jul. 15, 2016

(86) PCT No.: PCT/EP2016/066977
§ 371 (c)(1),
(2) Date: Jan. 18, 2018

(87) PCT Pub. No.: WO2017/013038
PCT Pub. Date: Jan. 26, 2017

(65) Prior Publication Data
US 2018/0207601 A1    Jul. 26, 2018

(30) Foreign Application Priority Data
Jul. 21, 2015 (FR) ....................... 15 56884

(51) Int. Cl.
| | |
|---|---|
| *B01J 8/38* | (2006.01) |
| *B01J 8/26* | (2006.01) |
| *B01J 8/00* | (2006.01) |
| *F23C 10/00* | (2006.01) |
| *F23C 10/10* | (2006.01) |
| *F23C 6/04* | (2006.01) |
| *C01B 21/04* | (2006.01) |
| *F23C 10/01* | (2006.01) |
| *F23C 10/08* | (2006.01) |

(52) U.S. Cl.
CPC ............. *B01J 8/388* (2013.01); *B01J 8/0055* (2013.01); *B01J 8/26* (2013.01); *C01B 21/0416* (2013.01); *F23C 6/04* (2013.01); *F23C 10/005* (2013.01); *F23C 10/01* (2013.01); *F23C 10/08* (2013.01); *F23C 10/10* (2013.01); *B01J 2208/00115* (2013.01); *F23C 2900/99008* (2013.01); *F23J 2217/40* (2013.01); *Y02E 20/346* (2013.01)

(58) Field of Classification Search
CPC ... B01J 8/388; B01J 8/26; B01J 8/0055; B01J 2208/00115; C01B 21/0416; Y02E 20/346; F23J 2217/40; F23C 10/01; F23C 10/08; F23C 10/005; F23C 2900/99008; F23C 6/04; F23C 10/10
See application file for complete search history.

(56) References Cited

U.S. PATENT DOCUMENTS 5,447,024 A * 9/1995 Ishida .................... F01K 3/188
                                                60/39.461
2011/0198861 A1    8/2011 Jallais et al.

FOREIGN PATENT DOCUMENTS

| FR | 2640728 A1 | 6/1990 |
|---|---|---|
| WO | 2010/043797 A1 | 4/2010 |
| WO | 2014/091024 A1 | 6/2014 |

OTHER PUBLICATIONS

International Search Report for PCT/EP2016/066977, dated Oct. 13, 2016; English translation submitted herewith (7 pgs.).

* cited by examiner

*Primary Examiner* — Anthony J Zimmer
(74) *Attorney, Agent, or Firm* — Fitch, Even, Tabin & Flannery, LLP (57) ABSTRACT

The invention concerns a CLC process, and its installation, producing high purity dinitrogen, comprising:
(a) the combustion of a hydrocarbon feed by reduction of a redox active mass brought into contact with the feed,
(b) a first step for oxidation of the reduced active mass (25) obtained from step (a) in contact with a fraction of a depleted air stream (21b), in order to produce a high purity stream of dinitrogen (28) and a stream of partially re-oxidized active mass (26);
(c) a second step for oxidation of the stream of active mass (26) in contact with air (20) in order to produce a stream of depleted air and a stream of re-oxidized active mass (24) for use in step (a);
(d) dividing the stream of depleted air obtained at the end of step (c) in order to form the fraction of depleted air used in step (b) and a fraction complementary to the depleted air extracted from the CLC.

20 Claims, 3 Drawing Sheets

CLC PROCESS AND INSTALLATION WITH THE PRODUCTION OF HIGH PURITY NITROGEN

FIELD OF THE INVENTION

The present invention relates to the field of the combustion of hydrocarbon feeds by chemical looping combustion (CLC), and more particularly to the production of nitrogen in the CLC.

GENERAL CONTEXT

Chemical Looping Combustion (CLC) is a process consisting of carrying out redox reactions on an active mass, typically a metal oxide, to break up the combustion reaction into two successive reactions: a first reaction for oxidation of the active mass in contact with an oxidizing gas, typically air, and a second reaction for reduction of the active mass in contact with the feed, the combustion of which is to be carried out. The CLC process resembles oxycombustion, with the principal difference being that the combustion is not supplied with a pure dedicated stream of oxygen as in the case of oxycombustion, but by the redoxing active mass acting as the transporter of the oxygen. This solid material is in the form of particles which are transported pneumatically by the gaseous reagents. These particles are oxidized in contact with air in a first reaction zone termed the air reactor. They are then transported into a second reaction zone known as the fuel reactor where they are brought into contact with a solid, liquid or gaseous hydrocarbon feed, the combustion of which is to be carried out. The oxygen transported by the particles of oxygen transporter material supplies the combustion of the feed. This results in a gaseous effluent formed by combustion of the feed, and a stream of reduced particles. The particles are returned to the air reactor for re-oxidation therein, thereby closing the loop.

It should be noted that, in general, the terms "oxidation" and "reduction" are used in relation to the respectively oxidized or reduced state of the active mass. The oxidation reactor, also known as the air reactor, is that in which the redox mass is oxidized and the reduction reactor, also known as the fuel reactor, is the reactor in which the redox mass is reduced. The reactors operate in fluidized bed mode and the active mass circulates between the oxidation reactor and the reduction reactor. Circulating fluidized bed technology is used to enable the active mass to pass continuously from its oxidized state in the oxidation reactor to its reduced state in the reduction reactor.

Chemical looping combustion can be used to produce energy in the form of steam or electricity, for example. The heat of combustion of the feed is similar to that encountered in conventional combustion. This corresponds to the sum of the heats of reduction and oxidation in the chemical loop. The heat is generally extracted by exchangers located inside, at the wall or associated with the fuel and/or air reactors, on the fume lines or on the active mass transfer lines.

The principal advantage of using a chemical looping combustion is of carrying out an intrinsic separation of $CO_2$ from the combustion air with the aim of capturing the $CO_2$ and storing it, for example in a deep aquifer, or of upgrading it, for example by using it to improve the yield from oilfield development in Enhanced Oil Recovery (EOR) or Enhanced Gas Recovery (EGR) processes.

Another advantage arises from this mode of combustion: a depleted air, namely a stream which is very rich in nitrogen, is produced. This depleted air is obtained following oxidation of the active mass in the air reactor.

The degree of nitrogen purity of this effluent depends in particular on the selected mode of combustion, and in particular on the excess of air required to ensure satisfactory re-oxidation of the particles of the active mass in the air reactor. Typically, in order to envisage total combustion, an excess of air for the oxidation reaction is desirable in order to be sure to completely re-oxidize the particles in the air reactor. This excess of air is also known in the present description as super-stoichiometry in respect of air.

Using an excess of air results in a flow rate of air which is higher than that which would be necessary for carrying out the oxidation reaction under stoichiometric conditions. The greater the excess of air for carrying out the reaction for oxidation of the active mass, the lower the nitrogen purity of the effluent will be, and in particular, the greater the quantity of residual oxygen it will contain because the oxygen of the air is not entirely used up to oxidize the active mass. This excess of air is, inter alia, governed by the thermodynamic equilibrium of the oxidized active mass as regards the gaseous effluent, i.e. the depleted air at the air reactor outlet.

A super-stoichiometry of air in the air reactor is thus necessary in order to ensure satisfactory oxidation of the active mass in the context of total combustion. However, this condition is incompatible with the production of a high purity stream of nitrogen in a single pass as is conventionally carried out in a CLC process.

In general, the depleted air at the outlet from the air reactor contains of the order of 2% by volume of oxygen, the complement being mainly composed of nitrogen and argon. This 2% of oxygen corresponds to a super-stoichiometry of the order of 10% for total combustion of the feed. This quantity of oxygen, even though it is relatively small, is still much higher than the required specifications concerning nitrogen for certain applications, for example of the order of 10 ppmv (parts per million by volume) for certain applications requiring anoxic type conditions.

The production of a stream of high purity nitrogen is in fact particularly interesting because this may be used in a variety of applications, in particular in the oil industry field. As an example, it may be used in the refinery as an inert gas in various oil refining processes or for the treatment of production water, or as a gas injected underground in EOR processes.

Thus, there is a need for the stream of nitrogen produced in a CLC process to be purified of its residual oxygen, in particular when total combustion of the feed is envisaged.

The production of high purity nitrogen by CLC is addressed in the article by Pröll et al., 2010 ("Syngas and a separate nitrogen/argon stream via chemical looping reforming—A 140 kw pilot plant study", T. Proll et al., Fuel 89 (2010):1249-1256). This article pertains to a CLC process aimed at producing syngas. In this case, only partial oxidation of the hydrocarbon feed is desired in order to produce the syngas and oxidation of the solid oxygen transporter is limited as a result. The tests disclosed show that in this case, almost complete consumption of the oxygen of the air may be obtained in the air reactor, and that it is therefore possible to produce, naturally, an effluent composed exclusively of nitrogen and argon.

However, this implementational mode cannot be envisaged when total combustion of the hydrocarbon feed is desired, because oxidation of the active mass transporting the oxygen must be substantial in order to limit the quantity of active mass employed. This constraint necessitates operating the oxidation reactor with an excess of air (super-stoichiometry of air), which results in a concentration of oxygen of several percent in the stream of nitrogen produced, as explained above.

The production of high purity nitrogen by CLC is also disclosed in patent application WO 2014/091024 A1. In that document, nitrogen produced in a CLC unit is used to extract natural gas from geological reservoirs. The nitrogen is injected into the reservoir in order to increase the pressure therein and improve the degree of recovery of the natural gas. In the CLC process disclosed, the feed treated in the CLC unit is natural diluted gas which contains a large quantity of nitrogen (more than 20%) deriving from the injection of nitrogen into the hydrocarbon reservoir.

The stream of nitrogen is produced in the CLC unit from the gaseous effluent leaving the oxidation reactor supplied with a gas containing nitrogen and oxygen, and with an oxygen carrier of the metal or metallic oxide type in a reduced form. The gas containing nitrogen and oxygen supplying the oxidation reactor is typically air or air enriched in nitrogen by a membrane separation technique before it is introduced into the oxidation reactor.

It is mentioned that the almost complete removal of the oxygen of the air in the air reactor is accomplished in a single pass through the air reactor or, alternatively, by passing the stream of air through the air reactor several times, or in fact by passing the stream of air into several air reactors until the oxygen has been eliminated to a large extent. A step for purification of the stream leaving the air reactor may also be carried out in order to obtain an oxygen content of less than 10 ppm. A catalytic separation route is envisaged.

However, irrespective of the separation technology employed, such a supplemental step carried out outside the chemical loop on the gas before or after passing it through the air reactor is expensive in terms of investment and energy costs. Furthermore, it is not demonstrated how a content of less than 10 ppm could be obtained without a supplemental purification step.

The article by Edrisi et al., 2014, also treats the production of high purity nitrogen in a CLC process ("Hydrogen, nitrogen and carbon dioxide production through chemical looping using iron-based oxygen carrier—A green plant for $H_2$ and $N_2$ production", A. Edrisi et al., International Journal of Hydrogen Energy 39(2014): 10380-10391). The authors propose a CLC process for the simultaneous production of hydrogen, nitrogen and high purity $CO_2$ effluents. The production of nitrogen is carried out in the reactor for oxidation of the solid oxygen transporter by consumption of oxygen from the air in contact with the solid. The need to operate with an excess of air is acknowledged by the authors, and a staged oxidation reactor with two oxidation steps is disclosed: the first step consists of bringing the reduced oxide into contact with air and is carried out with restricted air, i.e. the flow rate of air in this first step is lower than the flow rate of air necessary to carry out complete oxidation of the active mass. High purity nitrogen is thus produced at the end of this first step. The second step consists of to bringing the partially oxidized oxide obtained from the first step into contact with air and is carried out in an excess of air in order to ensure complete oxidation of the active mass.

However, in that CLC configuration, the production of nitrogen is limited because the first step is carried out with air which contains a very large quantity of oxygen to be removed (almost 21% by volume of oxygen).

AIMS AND SUMMARY OF THE INVENTION

The present invention is intended to at least partially overcome the problems of the prior art discussed above.

In general, the aim of the present invention is to provide a process and a CLC installation which can be used to produce high purity nitrogen, in particular when total combustion is desired, in particular in a good yield and minimizing the production costs in terms of investment and energy outlay.

Thus, in order to achieve at least one of the aims mentioned above, inter alia, in a first aspect, the invention proposes a CLC process for a hydrocarbon feed in which a redox active mass in the form of particles circulates between at least one reduction zone and two oxidation zones operating in fluidized bed mode, comprising the following steps:

(a) carrying out the combustion of said hydrocarbon feed by reduction of the redox active mass brought into contact with the feed in at least one reduction zone;

(b) in a first oxidation zone, carrying out a first step for oxidation of the reduced redox active mass obtained at the end of step (a) by being brought into contact with a first fraction of a stream of air depleted in oxygen, in order to produce a stream of dinitrogen comprising a quantity of 100 ppmv or less of dioxygen and a stream of partially re-oxidized redox active mass;

(c) in a second oxidation zone, carrying out a second step for oxidation of the stream of partially re-oxidized redox active mass obtained at the end of step (b), by being brought into contact with air in order to produce a stream of air depleted in oxygen and a stream of re-oxidized redox active mass for use in step (a);

(d) dividing said stream of air depleted in oxygen obtained at the end of step (c) in order to form the first fraction of the stream of air depleted in oxygen used in step (b) and a second fraction which is complementary to the stream of air depleted in oxygen extracted from the chemical loop.

The first fraction of the stream of air depleted in oxygen in step (d) may be adjusted to the quantity of reduced redox active mass obtained from step (a) and sent to the first oxidation zone in a manner such as to obtain a stream of dinitrogen comprising a given fraction of dioxygen.

Preferably, the stream of dinitrogen contains a quantity of 10 ppmv or less of dioxygen.

Advantageously, a super-stoichiometry of oxygen is applied during the second oxidation step (c), in a manner such as to obtain a stream of air depleted in oxygen comprising approximately 2% of dioxygen.

Preferably, the redox active mass comprises an oxide of manganese, the stream of air depleted in oxygen comprises approximately 2% of dioxygen, and the first fraction of the stream of air depleted in oxygen is less than 7.4% of the stream of air depleted in oxygen in a manner such as to produce a stream of dinitrogen comprising less than 10 ppmv of dioxygen.

In accordance with one embodiment of the process, the first oxidation zone is a reactor comprising a vessel provided with heat exchange means comprising a heat transfer fluid and, during the first oxidation step (b):

a fluidized bed of particles of redox active mass is generated by injecting the first fraction of the stream of air depleted in oxygen into said vessel, an exchange of heat is carried out between the fluidized bed of particles and the heat transfer fluid;

said stream of dinitrogen is evacuated via a first outlet located in an upper portion of the vessel, and the stream of partially re-oxidized redox active mass is evacuated via a second outlet located in a lower portion of the vessel in order to send it to the second reaction zone, preferably by means of a pneumatic valve.

In accordance with this embodiment, preferably, the first oxidation zone is operated in a manner such that the surface velocity of the air depleted in oxygen in the vessel is in the range 2 times to 10 times the terminal falling velocity of the particles of the redox active mass.

In accordance with another embodiment of the process, the first and second oxidation steps (b) and (c) are respectively carried out in a first oxidation reactor and a second oxidation reactor, both of the riser type, and:

- in step (b), said first oxidation reactor is operated in a manner such that the surface velocity of the air depleted in oxygen in said first reactor is in the range 2 to 15 m/s; a mixture leaving from the top of the first oxidation reactor is separated into the stream of dinitrogen and the stream of redox active mass in a gas/solid separator such as a cyclone;
- the stream of partially re-oxidized active mass is sent to the second reactor by means of a transport line comprising a siphon in order to provide a seal to gas between the first and second reactors; and
- in step (c), said second oxidation reactor is operated in a manner such that the surface velocity of the air in said second reactor is in the range 3 to 10 m/s.

The pressure of the first fraction of the stream of air depleted in oxygen may be raised before it enters the first oxidation zone.

Preferably, contact of the particles of the reduced redox active mass and of the first fraction of the stream of air depleted in oxygen in the first oxidation zone and contact of the stream of particles of the partially oxidized redox active mass and of air in the second oxidation zone is carried out in counter-current mode.

In accordance with a second aspect, the invention proposes an installation for carrying out the combustion of a hydrocarbon feed in accordance with the described process, comprising:

- at least one reduction zone for carrying out the combustion step (a), comprising an inlet for a stream of redox active mass in the form of particles, an inlet for said hydrocarbon feed, a discharge for a gaseous stream and for the reduced redox active mass;
- a first oxidation zone for carrying out the first oxidation step (b), comprising an inlet connected to the discharge for the reduced redox active mass obtained from the reduction zone, an inlet for the first fraction of the stream of depleted air, an outlet for the stream of dinitrogen and a discharge for the stream of partially re-oxidized redox active mass;
- a second oxidation zone for carrying out the second oxidation step (c), comprising an inlet connected to the discharge for the stream of partially re-oxidized redox active mass from the first oxidation zone, an inlet for a stream of air, an outlet for the stream of depleted air and a discharge for a stream of re-oxidized redox active mass connected to the reduction zone;
- means for dividing the stream of depleted air positioned at the outlet for the stream of depleted air from the second oxidation zone, comprising a first conduit for sending the first fraction of the stream of depleted air to the inlet for depleted air of the first oxidation zone and a second conduit to remove a second fraction which is complementary to the stream of air depleted in oxygen from the chemical loop;

the reduction and oxidation zones each comprising fluidization means.

Preferably, the installation comprises means for adjusting the first fraction of the stream of air depleted in oxygen to the quantity of reduced redox active mass introduced into the first oxidation zone in a manner such as to obtain a stream of dinitrogen comprising a given quantity of dioxygen, preferably a quantity of dioxygen of 10 ppmv or less.

In accordance with one embodiment, the first oxidation zone is a reactor comprising a vessel provided with heat exchange means and fluidization means, the heat exchange means comprising a heat transfer fluid and a heat exchange surface in contact with the heat transfer fluid and the redox active mass and separating the heat transfer fluid from the redox active mass, the fluidization means comprising means for injecting air depleted in oxygen in order to form a fluidized bed of particles, the fluidized bed being in contact with the heat exchange surface, the discharge for the stream of dinitrogen being located in an upper portion of the vessel, and the outlet for the stream of partially re-oxidized redox active mass being located in a lower portion of the vessel connected to the inlet for the stream of partially re-oxidized redox active mass from the second reaction zone.

In accordance with another embodiment, the installation comprises:

- a first oxidation reactor of the riser type, as the first oxidation zone;
- a second oxidation reactor of the riser type, as the second oxidation zone;
- a gas/solid separator such as a cyclone positioned downstream of the first oxidation reactor in a manner such as to receive a mixture leaving from the top of the first oxidation reactor, the mixture comprising the stream of dinitrogen and the stream of partially re-oxidized redox active mass;
- a siphon positioned on a transport line for the stream of partially re-oxidized active mass from the separator to the second oxidation reactor, in order to provide a gas seal between the first and second oxidation reactors.

Advantageously, the installation furthermore comprises a compression device such as a compressor or a blower positioned on the first conduit sending the first fraction of a stream of air depleted in oxygen to the first oxidation zone.

Other aims and advantages of the invention will become apparent from reading the description below of particular examples of embodiments of the invention, given by way of non-limiting examples, the description being made with reference to the accompanying figures which are described below.

BRIEF DESCRIPTION OF THE FIGURES

In the figures, the reference numerals for the same or similar elements are identical.

DESCRIPTION OF THE INVENTION

The objective of the invention is to propose a purification, integrated with the CLC, of the effluent produced after oxidation of a redox active mass with air, in a manner such as to produce a stream of high purity nitrogen which may then be used in many applications such as enhanced oil or gas recovery or oil refining.

More precisely, in order to produce such a stream of high purity dinitrogen, the present invention proposes purifying a fraction of depleted air produced in the chemical loop by bringing it into contact with the reducing oxide active mass in its most reduced state.

The term "high purity stream of nitrogen" means a stream of nitrogen comprising essentially dinitrogen, i.e. at least 99% dinitrogen, and a quantity of dioxygen of 100 ppmv or less, and preferably 10 ppmv or less. The complementary portion may be formed by the other gases which are normally present in air, such as the rare gases, essentially argon, but also neon, krypton, xenon, such as carbon dioxide ($CO_2$), or methane. It may also contain other gases in the form of traces, i.e. insignificant quantities, of less than 1 ppmv, such as dihydrogen, ozone or radon.

In the present description, the term "oxygen" is used to designate both the chemical element oxygen, but also the dioxygen molecule when reference is implicitly or explicitly made to the gas. Similarly, the term "nitrogen" is used to designate both the chemical element nitrogen, but also the molecule of dinitrogen when reference is implicitly or explicitly made to the gas.

It should also be noted that in the present description, the expressions "oxygen-transporting material" and "redox active mass" are equivalent. The redox mass is said to be active compared with its reactive capacities, in the sense that it is capable of acting as a transporter of oxygen in the CLC process by capturing and releasing oxygen. The abbreviated expression "oxygen carrier" or "active mass" or the term "solid" could also be used.

Figure 1:
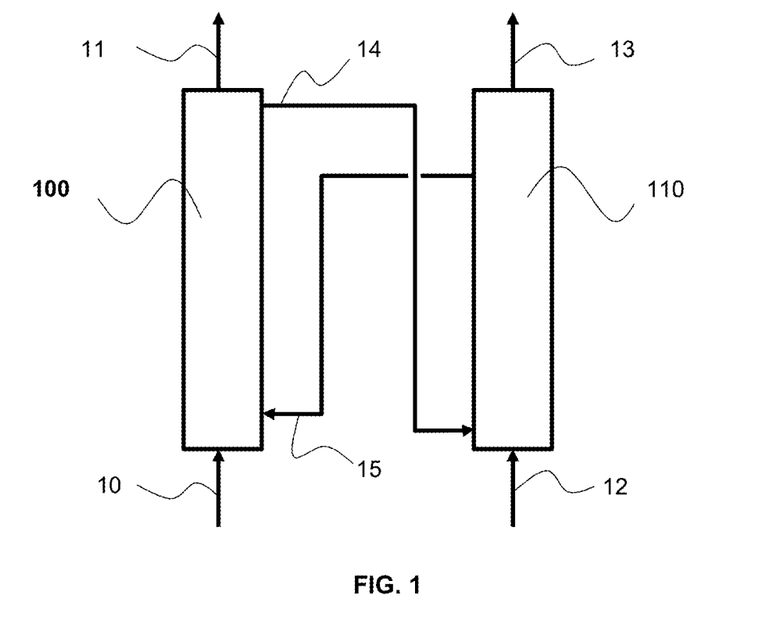
FIG. 1 is a process flow diagram for carrying out a CLC process.

FIG. 1 is a flow diagram representing the general operating principle of chemical looping combustion. A reduced oxygen carrier 15 is brought into contact with a stream of air 10 in a reaction zone 100 defined above as the air reactor (or oxidation reactor). A depleted air stream 11 and a stream of re-oxidized particles 14 are produced. The oxidized stream of oxygen carrier particles 14 is transferred into the reduction zone 110 which was defined above as the fuel reactor (or reduction reactor). The stream of particles 14 is brought into contact with a fuel 12, typically a hydrocarbon feed. This produces a combustion effluent 13 and a stream of reduced oxygen carrier particles 15. For the purposes of simplification, the representation of FIG. 1 does not include the various pieces of equipment which form part of the CLC unit for the purposes of heat exchange, compression, separation or possible recirculation of material around the air and fuel reactors.

In the reduction zone 110, the hydrocarbon feed 12 is brought into contact in counter-current mode with the redox active mass in the form of particles in order to carry out combustion of said feed by reduction of the redox active mass.

The redox active mass $M_xO_y$, where M represents a metal, is reduced to the state $M_xO_{y-2n-m/2}$, by means of the hydrocarbon feed $C_nH_m$, which in correlation therewith is oxidized to $CO_2$ and $H_2O$, in accordance with the reaction (1) below, or possibly to the mixture $CO+H_2$ depending on the proportions used.

(1)

In the present invention, the aim is for complete combustion of the hydrocarbon feed.

Combustion of the feed in contact with the active mass is carried out at a temperature which is generally in the range 600° C. to 1400° C., preferably in the range 800° C. to 1000° C. The contact time varies depending on the type of fuel feed used. It typically varies between 1 second and 10 minutes, for example and preferably between 1 and 5 minutes for a solid or liquid feed and preferably, for example, from 1 to 20 seconds for a gaseous feed.

A mixture comprising the gases obtained from combustion and the particles of the active mass is evacuated from the top of the reduction zone 110. Gas/solid separation means (not shown) such as a cyclone may be used to separate the combustion gases 13 from the solid particles of the active mass in their most reduced state 15. These latter are sent to the oxidation zone 100 for re-oxidation at a temperature which is generally in the range 600° C. to 1400° C., preferably in the range 800° C. to 1000° C.

In the oxidation reactor 100, the active mass is restored to its oxidized state $M_xO_y$, in contact with the air 10, in accordance with reaction (2) below, before returning to the reduction zone 110 and after having been separated from the air depleted in oxygen 11 evacuated from the top of the oxidation zone 100.

(2)

The active mass, alternately changing from its oxidized form to its reduced form and vice versa, describes a redox cycle.

The hydrocarbon feeds treated may be solid, liquid or gaseous hydrocarbon feeds: gaseous fuels (for example: natural gas, syngas, biogas), liquid fuels (for example: fuel, bitumen, diesel, gasolines etc) or solid fuels (for example: coal, coke, petcoke, biomass, oil sand, etc).

The redox mass may be composed of metallic oxides such as, for example oxides of Fe, Ti, Ni, Cu, Mn, Co, or V, alone or as a mixture, which may be derived from minerals (for example ilmenite or pyrolusite), or be synthetic (for example particles of nickel oxide supported on alumina, NiO/$NiAl_2O_4$), with or without a binder, and have the required redox properties and the characteristics necessary for carrying out fluidization. Depending on the type of material, the oxygen storage capacity of the redox mass is advantageously in the range 1% to 15% by weight. Advantageously, the quantity of oxygen effectively transferred by the metallic oxide is in the range 1% to 3% by weight, which means that only a fraction of the oxygen transfer capacity may be used, ideally less than 30% thereof in order to limit the risks of mechanical ageing or of agglomeration of particles. The use of only a fraction of the oxygen transport capacity also has the advantage that the fluidized bed acts as thermal ballast and thus smooths variations in the temperatures over the extent of the bed.

The active mass is in the form of fluidizable particles belonging to groups A, B or C of the Geldart classification. By way of non-limiting example, the particles of the redox active mass may belong to group B of the Geldart classification, and have a granulometry such that more than 90% of the particles are of a size in the range 100 µm to 500 µm, preferably in the range 150 µm to 300 µm, for a density in the range 1000 g/m³ to 5000 kg/m³ and preferably in the range 1500 g/m³ to 4000 kg/m³.

The redox active mass may undergo an activation phase in a manner such as to increase the reactive capacities, which may consist in a temperature rise phase, preferably progressive, and preferably in an oxidizing atmosphere (for example in air).

The CLC process in accordance with the invention has the general flow diagram presented in FIG. 1, with the exception of the oxygen carrier oxidation portion, which is described in general below with reference to FIG. 2.

In accordance with the invention, the CLC process includes a purification of a fraction of the depleted air formed during oxidation of the redox active mass.

Thus, it comprises the following steps:

(a) A Step for Combustion of the Hydrocarbon Feed.

It is carried out by reduction of the redox active mass by being brought into contact with the feed in at least one reduction zone, as described above with respect to FIG. 1.

(b) a first step for oxidation of the reduced redox active mass obtained from step (a): this is carried out in a first oxidation zone 201, by bringing the active mass obtained from (a) into contact with a first fraction of a stream of depleted air, in order to produce a stream of dinitrogen comprising a quantity of 100 ppmv or less of dioxygen and a stream of partially re-oxidized redox active mass.

(c) a second step for oxidation of the stream of partially re-oxidized redox active mass obtained at the end of step (b): this is carried out in a second oxidation zone 200 by bringing the active mass obtained from (b) into contact with air in order to produce said stream of depleted air and a stream of re-oxidized redox active mass for use in step (a).

(d) a step for dividing the stream of depleted air obtained from step (c): this division can be used to form the first fraction of depleted air used in step (b) and a second fraction which is complementary to the stream of depleted air extracted from the chemical loop.

Steps (b) to (d) are detailed below.

Step (b): First Step for Oxidation and Production of a Stream of Dinitrogen

The stream of particles of oxygen carrier in its most reduced state 25 is introduced into a first oxidation zone 201.

The term "most reduced state" means the maximum state of reduction of the redox active mass which leaves the reduction zone 110 and which is in its $M_xO_{y-2n-m/2}$ form in accordance with the equations (1) and (2). As an example, in the case of the redox pair $Fe_2O_3/FeO$, the maximum reduction state for the active mass corresponds to the form FeO. The proportion of active mass in the form of FeO depends on the quantity of oxygen transferred during the reduction step which is in the range 1% to 3% by weight.

This first reaction zone 201 acts to partially re-oxidize the redox active mass by contact with a fraction 21b of depleted air produced by a second oxidation zone 200, this latter having the same role as the air reactor 100, namely to completely re-oxidize the redox active mass so that it is once again used in the fuel reactor 110. Contact of the particles and of the fraction of depleted air is carried out in counter-current mode.

A gaseous effluent 28 is produced from this first oxidation step which has a concentration of oxygen of less than 100 ppmv, and preferably less than 10 ppmv, and a stream of at least partially re-oxidized particles 26.

The term "stream of partially re-oxidized particles" means a stream of particles wherein the proportion of active mass present in the oxidized form is lower than that contained in the stream of oxidized particles during the complete second oxidation step. In other words, the mass of oxygen transported by the stream of partially re-oxidized particles is lower than that transported by the stream of particles which have been completely re-oxidized during the second step. The difference in the mass of oxygen transported between these two streams depends on the quantity of recycled depleted air 21b and on the envisaged purity of nitrogen in the gaseous effluent 28.

The first oxidation step in the first reaction zone 201 can thus be used to produce the stream of high purity dinitrogen.

This stream 28 has been defined above. It comprises a quantity of 100 ppmv or less of dioxygen, preferably a quantity of 10 ppmv or less.

In the context of CLC, $CO_2$ may possibly be present in the effluent from the outlet of the air reactor, linked to the introduction into this reactor of unburnt hydrocarbons from the fuel reactor which accompany the circulating bed, principally in the case in which the combustion of solid or liquid hydrocarbon feeds is carried out. However, in this case, the $CO_2$ content can be controlled with the aid of specific equipment such as devices for the separation of particles described in patent applications WO 2011/151535 and WO 2011/151537.

Step (c): Second Oxidation Step

The stream of particles 26 is transferred to the second oxidation zone 200 to be brought into contact with a stream of air 20 intended to carry out complete re-oxidation of the particles of the redox active mass. Contact of the particles and air is carried out in counter-current mode.

The air sent to this first oxidation zone 200, also conventionally known as fresh air, is composed of approximately 21% of dioxygen and 78% of dinitrogen. The complement of approximately 1% is mainly composed of argon, but also of other rare gases such as neon, krypton and xenon, as well as carbon dioxide in an amount of approximately 0.04%.

This second oxidation step produces a stream of particles of oxygen carrier in a maximum and desired state of oxidation 24 and a stream of depleted air 21. Oxidation is carried out under conditions of super-stoichiometry of air, in a manner such as to ensure that the particles of oxygen carrier are in their maximum state of oxidation at the end of this second oxidation step.

The term "particles of re-oxidized active mass" means the particles in their maximum oxidation state, in their form $M_xO_y$, in accordance with equations (1) and (2). As an example, in the case of the redox pair $Fe_2O_3/FeO$, the maximum oxidation state means that the oxide of iron is in the form $Fe_2O_3$ in all of the particles.

The term "depleted air" means air depleted in oxygen, compared with the initial air (fresh air) before reaction in the oxidation zone. The depleted air preferably contains less than 4% of dioxygen. The dioxygen content of the depleted air depends on the quantity of dioxygen initially contained in the initial air (approximately 21% in the case of fresh air), and on the super-stoichiometry applied in order to ensure that the oxidation state of all of the particles is a maximum.

Typically, the depleted air comprises approximately 2% of dioxygen. The term "approximately" means plus or minus 0.5%. This results from the choice of applying a super-stoichiometry of the order of 10% in order to guarantee the maximum oxidation state of all of the particles. This super-stoichiometry is necessary in order to overcome the limitations of transfer between the oxygen and the particles and can vary as a function of the reaction kinetics with the oxygen carrier and the hydrodynamics in the reactor.

Step (d): Dividing the Depleted Air

The stream of depleted air 21 is divided at the outlet from the second oxidation zone 200 in order to form a first fraction of depleted air 21b recycled to the first oxidation zone 201 in order to carry out the first oxidation step, and a second complementary fraction 21a which is evacuated from the CLC unit. The second fraction is not zero: sending the entire stream of depleted air obtained from the second oxidation zone to the first oxidation zone is not envisaged. The recycle ratio for the depleted air is a function of the desired purity of the nitrogen. By way of non-limiting example, a recycle of 15% for the depleted stream of air, i.e. a first fraction equal to 15% of the total depleted air 21, initially containing 2% of dioxygen, means that a stream 28 containing of the order of 2 to 3 ppmv of dioxygen can be obtained.

Advantageously, then, the first fraction of depleted air in step (d) is adjusted with respect to the quantity of the reduced redox active mass obtained at the end of step (a) and sent to the first oxidation zone 201, in a manner such as to obtain a stream of dinitrogen 28 comprising a given fraction of dioxygen.

As an example, for a given active mass, with known properties, the flow rate for the depleted fraction of air 21b, for which depleted air the dioxygen content thereof is known, for example approximately 2%, is determined in order to partially oxidize the stream of particles 25 the flow rate of which is known, in a manner such as to produce a stream of dinitrogen comprising a quantity of 100 ppmv or less of dioxygen, and more preferably 10 ppmv or less.

In accordance with one embodiment, the redox active mass comprises a manganese oxide, the stream of depleted air comprises approximately 2% of dioxygen, and the first fraction of depleted air is less than 7.4% of the stream of depleted air in a manner such as to produce a stream of dinitrogen comprising less than 10 ppmv of dioxygen.

Before being brought into contact with the particles of oxygen carrier, the stream of depleted air 21b may be conditioned in order to adapt it to the operating conditions of the reaction 201, by means of a conditioning device 202. In fact, the proper operation of a CLC unit the oxygen transporter of which is in a moving bed is generally ensured by precisely controlling the pressure balance of the unit. The conditioning step may thus typically comprise compressing the fraction of depleted air 21b with the aid of a pressurizing device such as a compressor, or even a blower, in order to produce a fraction of compressed depleted air 27. The conditioning step may also comprise, if required, an exchange of heat with the aid of a heat exchange device in order to adapt it to the selected compressor technology. This conditioning step is preferred, but it is optional provided that the pressure balance of the unit can be adjusted by modifying the relative position of the reaction zones.

Figure 2:
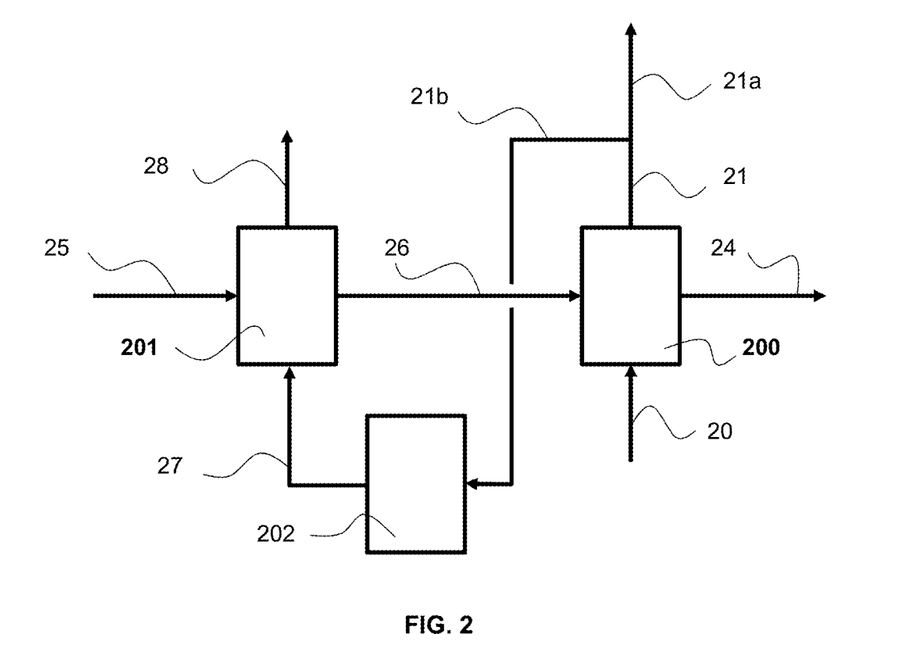
FIG. 2 is a process flow diagram for carrying out oxidation of the redox active mass with the production of dinitrogen in the CLC process of the invention.

The CLC process is carried out in an installation which comprises, with reference to FIG. 1 for the reduction of the active mass portion and FIG. 2 for the oxidation of the active mass portion:

at least one reduction zone 110 for carrying out the combustion of the feed 12, comprising an inlet for the stream of active mass 14, an inlet for the hydrocarbon feed 12, a discharge for the combustion gases 13, essentially $CO_2$ and $H_2O$, and for the reduced redox active mass 25. A plurality of reduction zones may be employed in order to carry out the combustion of the feed (total combustion envisaged).

a first oxidation zone 201 for carrying out the first oxidation step (b), comprising an inlet connected to the discharge for the reduced redox active mass 25 obtained from the reduction zone 110, an inlet for the first fraction of depleted air 21b, an outlet for the stream of dinitrogen 28 and a discharge for the stream of partially re-oxidized redox active mass 26.

a second oxidation zone 200 for carrying out the second oxidation step (c), comprising an inlet connected to the discharge for the stream of partially re-oxidized redox active mass 26 from the first oxidation zone 201, an inlet for a stream of air 20, an outlet for the stream of depleted air 21 and a discharge for a stream of re-oxidized redox active mass 24 connected to the reduction zone 110;

means for dividing the stream of depleted air positioned at the outlet for the stream of depleted air 21 from the second oxidation zone 200, comprising a first conduit for sending the first fraction of depleted air 21b to the inlet for depleted air of the first oxidation zone 201 and a second conduit to take a second fraction 21a which is complementary to the depleted air 21a from the chemical loop. The means for dividing the stream of depleted air preferably comprise a system of valves to adjust the flow rate of the two depleted fractions of air 21a and 21b. The distribution of the streams of gas 21a and 21b between the conduits may, for example, be carried out by installing dedicated solid/gas separation devices such as cyclones, which are distinct for each of the conduits. In this case, modifying the stream towards one or the other of the conduits is carried out both by controlling the section of each of the conduits and by controlling the pressure balance of the unit. This separation may also be carried out downstream of the solid/gas separation devices by adapting the pressure drops over one or the other of the conduits or even over both of them, using devices which induce pressure drops such as valves. Typically, these valves are mechanical, for example of the butterfly or guillotine type. The choice of valve type takes into account the temperature of the operation as regards the choice of materials (refractory steels, special alloys, internal cooling system, lagging). Here again, this distribution may be modified by modifying the respective diameters of the conduits. If the conditioning system 202 requires a reduction in the temperature of the fluid 21b, preferably, the pressure modification device will be positioned on the cooled fluid. In similar manner, if a device for modifying the pressure drop is provided on the conduit for the stream 21a, it is preferably positioned downstream of the heat recovery elements which are optionally installed there.

The reduction and oxidation zones each comprise fluidization means in order to ensure circulating fluidized bed operation of the chemical loop.

These fluidization means are, for example, devices for injecting gas of the injector crown type or any other appropriate device (perforated plate, bubble cap trays, injection nozzles, diffusers, etc), which are well known to the person skilled in the art.

It should be understood that the CLC installation may include various devices which are not shown; non-exhaustive examples which may be cited are devices for controlling the stream of solid such as valves, gas/solid separation devices, heat exchange devices, elutriation devices, or sealing devices such as siphons.

Figure 3:
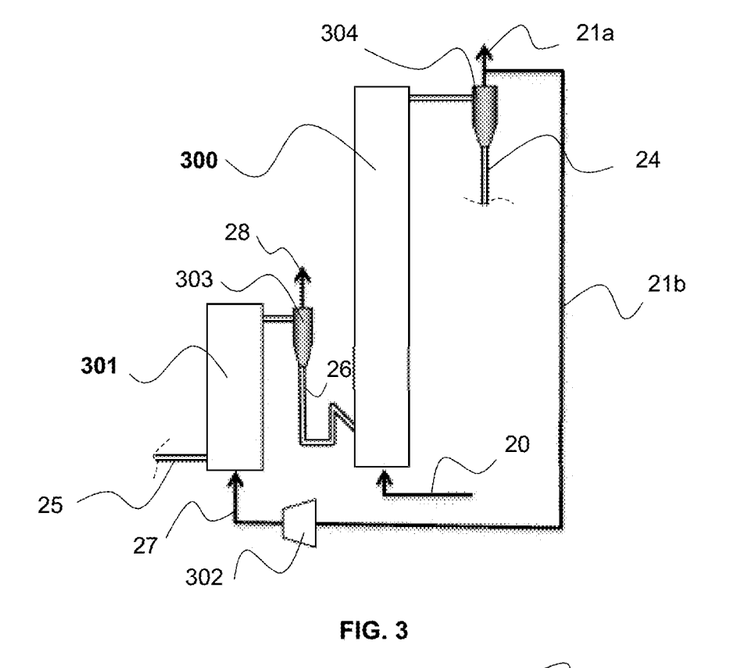
FIGS. 3 and 4 are flow diagrams illustrating two implementational examples of oxidation of the active mass with the production of dinitrogen in the CLC process of the invention.
Figure 4:
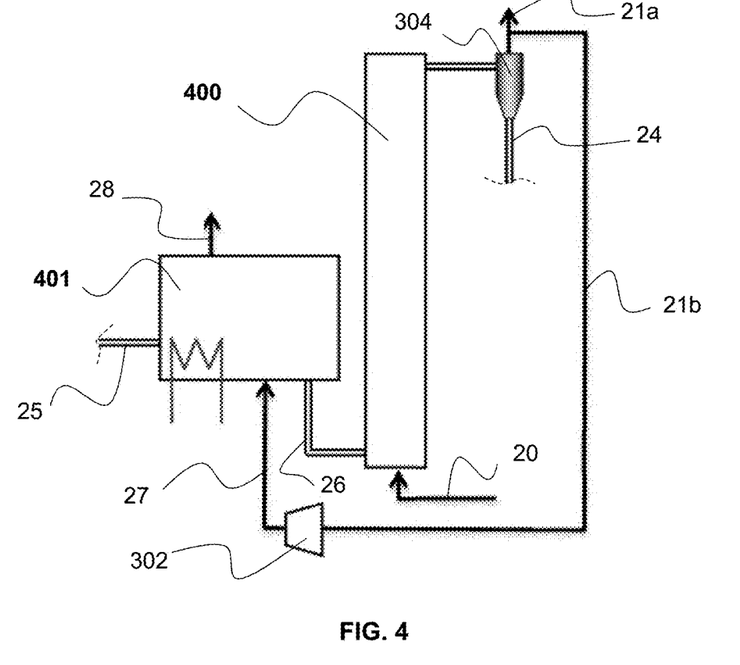

FIGS. 3 and 4 each illustrate an example of carrying out the CLC process in accordance with the invention. These examples are not limiting and many other configurations may be envisaged. Only a portion of the CLC installation relating to oxidation of the active mass and to the production of a stream of dinitrogen is shown.

Referring to FIG. 3, the CLC installation comprises two oxidation reactors 301 and 300 of the type routinely referred to as a riser, respectively forming the first oxidation zone where the stream of high purity dinitrogen 28 is formed and the second oxidation zone where the active mass is completely re-oxidized. A riser type reactor is an essentially elongate and vertical reactor operating in transported fluidized bed mode. A gas/solid separator 303 such as a cyclone is positioned downstream of the first oxidation reactor 301 in order to receive the mixture leaving from the top of the reactor 301, which comprises the stream of dinitrogen 28 and the stream of partially re-oxidized redox active mass 26. A siphon is positioned on the transport line for the partially re-oxidized active mass stream 26 from said separator 303 towards the second oxidation reactor 300, to provide a seal to gas between the two air reactors, 301 and 300. A gas/solid separator 304 such as a cyclone is positioned downstream of the second oxidation reactor 300 in order to receive the mixture leaving the top of the reactor 300, which comprises depleted air (21a and 21b) and the stream of re-oxidized redox active mass 24. At the outlet from the cyclone 304, two conduits are provided in order to divide the stream of depleted air. A first conduit conveys a first fraction of the depleted air 21b towards the first air reactor 301. A second conduit extracts the second complementary fraction of depleted air 21a from the CLC unit. A compression device 302 such as a compressor or a blower may be present on the conduit bringing the fraction of depleted air 21b to the inlet for depleted air of the air reactor 301.

The fraction of depleted air 21a is withdrawn from the outlet from the second air reactor 300 for recycling upstream of the reactor 300 into the first air reactor 301. In this first reactor 301, this is brought into contact with the reduced oxygen carrier 25. The pressure of the fraction of depleted air 21a is increased before it is introduced, in the form of a stream 27, into the reactor 301 principally in order to compensate for the pressure drops of the fluidized beds in the reaction zones 300 and 301, as well as those generated by the respective injection devices of these two zones. This rise in pressure may be carried out by means of a compressor 302 or even a blower, provided that in the majority of cases, the pressure drop to be compensated for is less than 1 bar.

In accordance with this embodiment, the first air reactor 301 comprises a transported fluidized bed in which the velocity of the gas phase is in the range 2 m/s to 15 m/s, and preferably in the range 2 to 10 m/s. By way of example, such a reactor may have a diameter in the range 3 m to 6 m for a height in the range 10 m to 30 m. The gas produced 28 is then separated from the stream of solid 26 in the gas/solid separator 303. The gas seal between the reactors 301 and 300 is, for example, ensured by the siphon fluidised with nitrogen (from the stream of nitrogen produced in the reactor 301). The seal is in fact required in order to maintain the specifications regarding the dioxygen content in the stream of dinitrogen 28.

In the second air reactor 300, the stream of oxygen carrier is re-oxidized in order to produce a stream of re-oxidized oxygen carrier 24 which is intended to be used again in the reduction step for the combustion of the hydrocarbon feed. The velocity of the gas in the second air reactor 300 is typically in the range 3 m/s to 10 m/s. The mixture comprising depleted air and the stream of re-oxidized particles leaves the top of the reactor 301 and enters the gas/solid separator 304. The stream of depleted air leaving the cyclone 304 is then divided into a first fraction 21b and a second, complementary fraction 21a leaving the chemical loop.

In accordance with another embodiment, the first oxidation zone is installed in a space dedicated to another function such as oxidation of the active mass.

Thus, referring to FIG. 4, the CLC installation comprises a first reactor 401 comprising a vessel provided with heat exchange means and fluidization means, in order to operate a fluidized bed, and a second air reactor 400 of the riser type.

The heat exchange means comprise a heat transfer fluid and a heat exchange surface. This surface can be used to exchange heat between the particles of active mass and the heat transfer fluid which are separated by this surface.

The fluidization means comprise means for the injection of depleted air in order to form a fluidized bed of particles in contact with the heat exchange surface.

The vessel of the reactor 401 comprises a discharge for the stream of dinitrogen 28 located in the upper portion of the vessel and an outlet for the stream of partially re-oxidized redox active mass 26 located in a lower portion of the vessel and connected to the inlet for the stream of particles for the second air reactor 400.

Thus, in accordance with this embodiment, the first reactor 401 can withdraw a fraction of the heat produced by the combustion. The heat exchange is advantageously carried out downstream (referring here to the circulation of solid oxygen carrier) of the reduction zone, i.e. downstream of the generally endothermic reaction zone.

The operating conditions are preferably fixed in a manner such that the depleted air has a surface velocity in the range 2 to 10 times the terminal falling velocity of the particles of oxygen carrier. By way of illustration, this corresponds to a heat exchanger (vessel 401) with a rectangular section of 10 m by 20 m, with a nitrogen production containing 10 ppmv of dioxygen in the range 13 to 80 tonnes/h in a reactor 401 operated at 900° C. The particles of active mass after reaction in the first reactor 401 are then discharged into the second air reactor 400, for example by means of a pneumatic L type valve. The seal is preferably provided by the pressure balance which causes the gas phase to fall from the first reactor 401 towards the second air reactor 400.

The reactions in the air reactors 401 and 400 are identical to those described with reference to FIGS. 2 and 3. Similarly, the circuit for the streams leaving the second air reactor 400 is identical to that described for FIG. 3 and will not be reiterated here.

Applications

One of the applications for which it is advantageous to employ the present invention is the enhanced recovery of hydrocarbons (EOR or EGR), where nitrogen may be used to pressurize a reservoir of liquid or gaseous hydrocarbons in a manner such as to increase the recovery ratio. One of the gases routinely used for this application is $CO_2$, which has advantages over the use of nitrogen, principally in the case of EOR in terms of viscosity and miscibility with the hydrocarbons. However, EOR using nitrogen, also known by the term $N_2$-EOR, may enjoy particular advantages such as the absence of corrosion problems, often encountered with the use of $CO_2$ under humid conditions and in old installations. Using nitrogen requires neither the use of a specific metallurgy, nor the injection of anticorrosive reagents, nor the replacement of corroded parts on existing equipment.

Another critical element in techniques for the enhanced recovery of hydrocarbons is the pressure of the reservoir. In cases in which the pressure of the reservoir is low, the miscibility of $CO_2$ in the hydrocarbons to be extracted is not sufficient to reduce the viscosity thereof. The parameter controlling how the hydrocarbon leaves the reservoir is then only the pressure which will be applied, a function which nitrogen can fulfil as well as $CO_2$.

Finally, another parameter determining the choice of gas employed for the enhanced recovery of hydrocarbons is its availability. Locations where EOR with $CO_2$ is used the most for oil production are locations including large natural reservoirs of $CO_2$. When this resource is not available, and the configuration of the reservoir allows it (for example low pressure in the reservoir), it may be advantageous to use $N_2$-EOR.

Currently, there are examples of using $N_2$-EOR where the production of a stream of dinitrogen comprising less than 10 ppmv of $O_2$ is carried out by cryogenic distillation. This low concentration of $O_2$ is in particular required in order to limit reactions with the lubricants of the compression equipment, to avoid oxidation of the hydrocarbons of the reservoir, and to avoid side reactions which could result in undesirable products or precipitates. Furthermore, given that a portion of the injected gas leaves with the hydrocarbons produced, limiting the dioxygen content is desirable so that problems with safety (explosion, products catching fire) do not arise. Thus, the present invention can be used to provide a stream of high purity dinitrogen which can be used for $N_2$-EOR as an alternative to the production of nitrogen by cryogenic distillation.

Another example of an application for the present invention is the provision of a nitrogen utility in a hydrocarbon refinery. In fact, in hydrocarbon refineries, typically oil refineries, dinitrogen is widely used. By way of example, a small refinery with a production of 40000 barrels per day (bpd) has a nitrogen consumption of 2.5 t/h, i.e. 2150 Nm³/h. This nitrogen has a minimum purity of 99.9%. Table 1 below details the expected specifications for this gas.

TABLE 1

| Component | Specification |
| --- | --- |
| $N_2$ | 99.9% wt/wt min. |
| $O_2$ | 10 ppmv max. |
| $CO_2$ | 10 ppmv max. |
| CO | 10 ppmv max. |
| Other carbonaceous compounds | 5 ppmv max. |
| $Cl_2$ | 1 ppmv max. |
| $H_2O$ | 5 ppmv max. |
| $H_2$ | 20 ppmv max. |

In refineries, dinitrogen is used in particular to render various pieces of equipment in the refining processes inert, and to render various pieces of storage equipment or equipment for transporting products to site inert. The aim of this inerting is in particular to avoid the formation of dangerous or explosive atmospheres and to avoid oxidation of the products. Dinitrogen is also used in the treatment of water to strip volatile organic compounds (VOC) from the water produced.

Example

The example below is intended to illustrate some of the advantages of the present invention.

Consider a CLC thermal power plant with a nominal output of 1000 MWth. The hydrocarbon feed in this example was a South African coal with the typical composition shown in Table 2 below.

TABLE 2

| Element | Content (%) |
| --- | --- |
| Ash | 15.1 |
| C | 70.7 |
| H | 4.3 |
| O | 7.7 |

TABLE 2-continued

| Element | Content (%) |
| --- | --- |
| N | 1.3 |
| S | 0.9 |

The CLC unit comprised two air reactors to carry out oxidation of the redox active mass, as described in relation to FIG. 2.

The flow rate of air necessary for total combustion of this feed was 290 Nm³/s assuming a super-stoichiometry of 10%.

In simplified manner, the air was composed of 21% of oxygen and 79% of nitrogen.

This flow rate of air was supplied to the second air reactor 200 in order to oxidize the oxygen carrier. The stream of depleted air obtained from the second air reactor contained 2% of $O_2$. The fraction of depleted air which was recycled and brought into contact with the particles of oxygen carrier in the first reduced air reactor 201 depends on the purity required for the stream of dinitrogen as well as on the nature of the oxygen transporter used.

Figure 5:
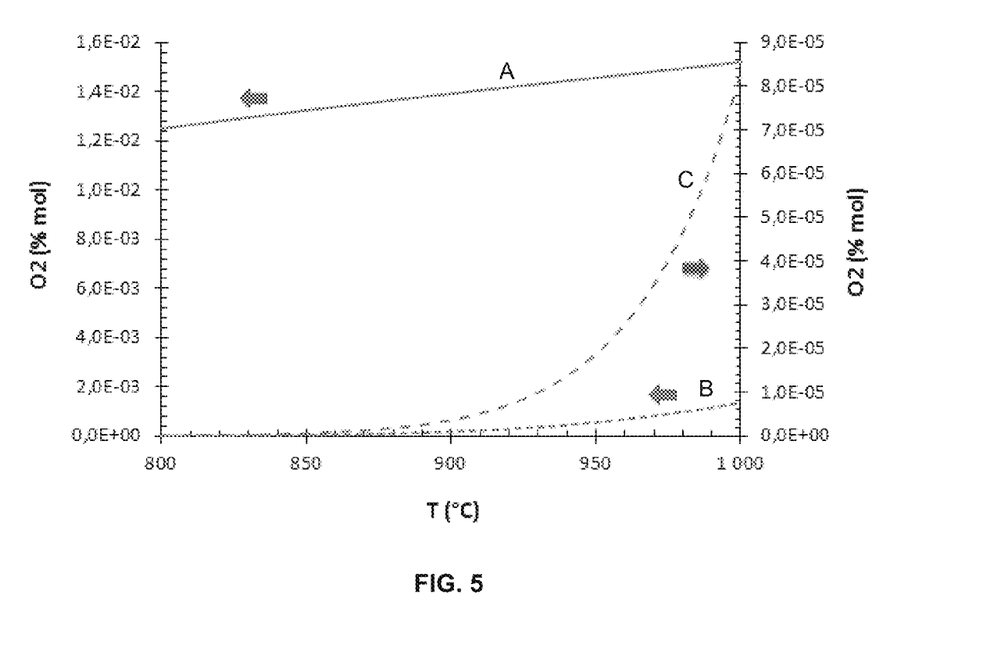
FIG. 5 is a diagram representing the simulated reactive thermodynamic equilibrium for an example of an active mass based on partially reduced manganese oxide in the presence of a depleted air for different ratios of the mass flow of active mass over the mass flow of oxygen.

Various types of oxygen transporter may be used. In particular, transition metal oxides alone or as a mixture such as those of nickel, cobalt, copper, iron or manganese may be used, inter alia. The performances of these oxygen transporters were measured as a function of their capacity to transport oxygen, but also as a function of their stability as regards a reduced partial pressure of oxygen. In this example, the use of an oxygen transporter based on manganese was considered (oxides employed: $MnO_2$, MnO, $Mn_2O_3$, $Mn_3O_4$. FIG. 5 represents the reactive thermodynamic equilibrium of a partially reduced manganese oxide in the presence of a depleted air for three ratios of mass stream of active mass over the mass stream of treated gas (stream of gas entering the first air reactor 201 containing 2% of oxygen).

In FIG. 5, curve A as a solid line represents this equilibrium for a ratio r equal to the stream of active mass over the stream of $O_2$ in the incoming air of 1.8 t/kg, curve B in short dashes represents this equilibrium for a ratio of 6 t/kg, and curve C, in long dashes, represents this equilibrium for a ratio of 9 t/kg. The temperature is shown along the abscissa (in ° C.) and the concentration of O2 in the treated gas (as a molar %) is shown up the ordinate. The arrow to the side of each curve indicates which of the values up the ordinate should be read. The values for curves A and B are read up the ordinate to the left of the graph, and the values for curve C should be read up the ordinate to the right of the graph.

In this example, the second air reactor 200 is operated at 900° C. The resulting concentration of air depleted in $O_2$ of 2% is obtained from fresh air for a ratio of 10.7 kg of active mass per kg of air injected.

In the first reactor, the concentration of 2% of oxygen in the gas to be treated corresponds to a ratio of 0.6 tonnes of active mass per kg of injected oxygen.

FIG. 5 shows that by multiplying the value for this ratio by a factor of 3, corresponding to curve A (ratio r of 1.8 t/kg), the residual concentration of O2 falls to 1.4%.

This same concentration falls to 174 ppmv by multiplying the value for this ratio by 10 (case of curve B, with a ratio r of 6 t/kg) and to 2.6 ppmv by multiplying the value for this ratio by 15 (case of curve C, with a ratio r of 9 tonnes/kg).

In the case in which a concentration of less than 10 ppmv is to be provided, a ratio of a minimum of 8.1 tonnes of active mass per kg of oxygen must be applied, which means that the first air reactor 201 is operated with a fraction of the depleted air flow leaving the air reactor containing 2% $O_2$ equal to 1/13.5, i.e. 7.4% of the flow of depleted air 21.

In accordance with this example, the flow rate for air of 290 $Nm^3/s$ used for the total combustion in the second reactor produces depleted air containing 2% of oxygen, corresponding to a flow rate of nitrogen of 1000 t/h. By treating 7.4% of this depleted air in the first reactor, then, 74 t/h of nitrogen containing 10 ppmv of $O_2$ can be produced with a 1000 MWth CLC unit.

In accordance with the invention, it is advantageous to use depleted air in the first air reactor rather than fresh air in order to produce a stream of high purity dinitrogen.

A first advantage is that it is thus possible to reduce the size of the first air reactor producing the stream of dinitrogen, because approximately 90% of the oxygen of the air has been consumed in the second air reactor.

Another advantage to using depleted air is that it is then possible to produce more nitrogen compared with the production which would be obtained with fresh air. In fact, the concentration of oxygen at the outlet from the reactor is governed by the thermodynamic equilibrium between the oxygen of the air and the concentration of oxygen in the particles of active mass. In the case of an injection of fresh air, more oxygen has to be consumed by the active mass in order to reach the desired specification (10 ppmv of $O_2$). Turning again to data for the present example, a ratio of 10.7 kg of active mass per kg of injected air is required in the second reactor in order to carry out total combustion of the feed. For a flow rate of air of 290 $Nm^3/s$, the flow rate of the active mass is consequently 3.9 t/s. In the first reactor, a minimum ratio of 8.1 tonnes of active mass per kg of oxygen is required in order to reach the specification of 10 ppmv of dioxygen. Thus, for a flow rate of active mass of 3.9 t/s, the maximum flow rate of oxygen which can be purified in the first reactor is 0.48 kg/s.

By using depleted air, this flow rate of oxygen corresponds to 2 molar % of the total flow, the complement being nitrogen. The production of nitrogen containing 10 ppm of $O_2$ rises in this case to 74 t/h.

By using fresh air, this same flow rate of oxygen would correspond to 21 molar % of total flow rate, the complement being nitrogen. Thus, it would be necessary to reduce the total flow rate compared with the preceding case in order to satisfy the specifications, which would limit the production of nitrogen containing 10 ppm of 02 to 5.7 t/h.

Thus, for the same quantity of active mass employed, the production of nitrogen can be multiplied by a factor of 13 under the conditions of the example, by preferring to use depleted air instead of fresh air.

The invention claimed is:

1. A process for the combustion of a hydrocarbon feed by chemical looping combustion, in which a redox active mass in the form of particles circulates between at least one reduction zone and two oxidation zones operating in fluidized bed mode, in which:
   (a) combustion of the hydrocarbon feed is carried out by reduction of the redox active mass brought into contact with the feed in at least one reduction zone;
   (b) in a first oxidation zone, a first step for oxidation of the reduced redox active mass obtained at the end of step (a) is carried out by being brought into contact with a first fraction of a stream of air depleted in oxygen, in order to produce a stream of dinitrogen comprising a quantity of 100 ppmv or less of dioxygen and a stream of partially re-oxidized redox active mass;
   (c) in a second oxidation zone, a second step for oxidation of the stream of partially re-oxidized redox active mass obtained at the end of step (b) is carried out, by being brought into contact with air in order to produce the stream of air depleted in oxygen and the stream of re-oxidized redox active mass for use in step (a);
   (d) the stream of air depleted in oxygen obtained at the end of step (c) is divided in order to form the first fraction of the stream of air depleted in oxygen used in step (b) and a second fraction of the stream of air depleted in oxygen which is extracted from the chemical loop.

2. The process as claimed in claim 1, in which a flow rate of the first fraction of the stream of air depleted in oxygen in step (d) is adjusted with respect to a flow rate of the reduced redox active mass obtained from step (a) and sent to the first oxidation zone in a manner such as to obtain the stream of dinitrogen comprising a given fraction of dioxygen.

3. The process as claimed in claim 1, in which the stream of dinitrogen contains a quantity of 10 ppmv or less of dioxygen.

4. The process as claimed in claim 1, in which a super-stoichiometric amount of oxygen is applied during the second oxidation step (c), in a manner such as to obtain a stream of air depleted in oxygen comprising approximately 2% of dioxygen.

5. The process as claimed in claim 1, in which the redox active mass comprises an oxide of manganese, the stream of air depleted in oxygen comprises approximately 2% of dioxygen, and the first fraction of the stream of air depleted in oxygen is less than 7.4% of the stream of air depleted in oxygen, in a manner such as to produce a stream of dinitrogen comprising less than 10 ppmv of dioxygen.

6. The process as claimed in claim 1, in which the first oxidation zone is a reactor comprising a vessel provided with heat exchange means, the heat exchange means comprising a heat transfer fluid and in which, during the first oxidation step (b):
   a fluidized bed of particles of redox active mass is generated by means of injecting the first fraction of the stream of air depleted in oxygen into the vessel,
   an exchange of heat is carried out between the fluidized bed of particles and the heat transfer fluid;
   the stream of dinitrogen the is evacuated via a first outlet located in an upper portion of the vessel, and
   the stream of partially re-oxidized redox active mass is evacuated via a second outlet located in a lower portion of the vessel in order to send it to the second reaction zone, preferably by means of a pneumatic valve.

7. The process as claimed in claim 6, in which the first oxidation zone is operated in a manner such that the surface velocity of the air depleted in oxygen in the vessel is in the range 2 times to 10 times the terminal falling velocity of the particles of the redox active mass.

8. The process as claimed in claim 1, in which the first and second oxidation steps (b) and (c) are respectively carried out in a first oxidation reactor and a second oxidation reactor, the first oxidation reactor and the second oxidation reactor being riser reactors, and in which:
   in step (b), the first oxidation reactor is operated in a manner such that the surface velocity of the air depleted in oxygen in the first reactor is in the range 2 to 15 m/s;
   a mixture leaving from the top of the first oxidation reactor is separated into the stream of dinitrogen and the stream of redox active mass in a gas/solid separator;

the stream of partially re-oxidized active mass is sent to the second reactor by means of a transport line comprising a siphon in order to provide a seal to gas between the first and second reactors; and in step (c), the second oxidation reactor is operated in a manner such that the surface velocity of the air in said second reactor is in the range 3 to 10 m/s.

9. The process as claimed in claim 1, in which the pressure of the first fraction of the stream of air depleted in oxygen is raised before it enters the first oxidation zone.

10. The process as claimed in claim 1, in which contact of the particles of the reduced redox active mass and of the first fraction of the stream of air depleted in oxygen in the first oxidation zone and contact of the stream of particles of the partially oxidized redox active mass and of air in the second oxidation zone is carried out in counter-current mode.

11. An installation for carrying out the combustion of a hydrocarbon feed in accordance with claim 1, comprising:
   at least one reduction zone for carrying out the combustion step (a), comprising an inlet for a stream of redox active mass in the form of particles, an inlet for the hydrocarbon feed, a discharge for a gaseous stream and for the reduced redox active mass;
   a first oxidation zone for carrying out the first oxidation step (b), comprising an inlet connected to the discharge for the reduced redox active mass obtained from the reduction zone, an inlet for the first fraction of the stream of depleted air, an outlet for the stream of dinitrogen and a discharge for the stream of partially re-oxidized redox active mass;
   a second oxidation zone for carrying out the second oxidation step (c), comprising an inlet connected to the discharge for the stream of partially re-oxidized redox active mass from the first oxidation zone, an inlet for a stream of air, an outlet for the stream of air depleted in oxygen and a discharge for a stream of re-oxidized redox active mass connected to the reduction zone;
   means for dividing the stream of air depleted in oxygen positioned at the outlet for the stream of air depleted in oxygen from the second oxidation zone, comprising a first conduit for sending the first fraction of the stream of air depleted in oxygen to the inlet for air depleted in oxygen of the first oxidation zone and a second conduit to remove a second fraction of the stream of air depleted in oxygen from the chemical loop;
the reduction and oxidation zones each comprising fluidization means.

12. The installation as claimed in claim 11, comprising means for adjusting a flow rate of the first fraction of the stream of air depleted in oxygen to a flow rate of the reduced redox active mass introduced into the first oxidation zone in a manner such as to obtain a stream of dinitrogen comprising a given quantity of dioxygen.

13. The installation as claimed in claim 11, in which:
   the first oxidation zone is a reactor comprising a vessel provided with heat exchange means and fluidization means, the heat exchange means comprising a heat transfer fluid and a heat exchange surface in contact with the heat transfer fluid and the redox active mass and separating the heat transfer fluid from the redox active mass, the fluidization means comprising means for injecting air depleted in oxygen in order to form a fluidized bed of particles, the fluidized bed being in contact with the heat exchange surface,
   the discharge for the stream of dinitrogen being located in an upper portion of the vessel, and
   the outlet for the stream of partially re-oxidized redox active mass being located in a lower portion of the vessel connected to the inlet for the stream of partially re-oxidized redox active mass from the second reaction zone.

14. The installation as claimed in claim 11, comprising:
   a first oxidation riser reactor, as the first oxidation zone;
   a second oxidation riser reactor, as the second oxidation zone;
   a gas/solid separator, positioned downstream of the first oxidation reactor in a manner such as to receive a mixture leaving from the top of the first oxidation reactor, the mixture comprising the stream of dinitrogen and the stream of partially re-oxidized redox active mass;
   a siphon positioned on a transport line for the stream of partially re-oxidized active mass from the separator to the second oxidation reactor, in order to provide a gas seal between the first and second oxidation reactors.

15. The installation as claimed in claim 11, comprising a compression device positioned on the first conduit sending the first fraction of the stream of air depleted in oxygen to the first oxidation zone.

16. The installation as claimed in claim 12, wherein the means for adjusting the flow rate of the first fraction of the stream of air depleted in oxygen to the flow rate of the reduced redox active mass introduced into the first oxidation zone adjusts the flow rate of the first fraction of the stream of air depleted in oxygen to obtain a stream of dinitrogen comprising a given quantity of dioxygen of 10 ppmv or less.

17. The process as claimed in claim 1, wherein the gas/solid separator is a cyclone.

18. The installation as claimed in claim 14, wherein the gas/solid separator is a cyclone.

19. The installation as claimed in claim 15, wherein the compression device is a compressor.

20. The installation as claimed in claim 15, wherein the compression device is a blower.

* * * * *